Figure 6:
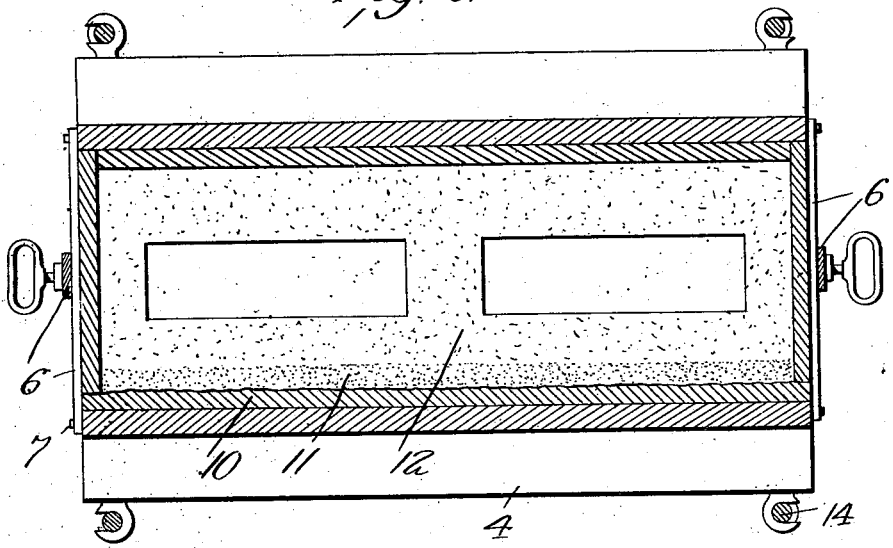

No. 754,640. PATENTED MAR. 15, 1904.
J. BROWER.
METHOD OF MAKING BLOCKS FOR BUILDING OR LIKE PURPOSES.
APPLICATION FILED AUG. 22, 1903.
NO MODEL. 3 SHEETS—SHEET 1.
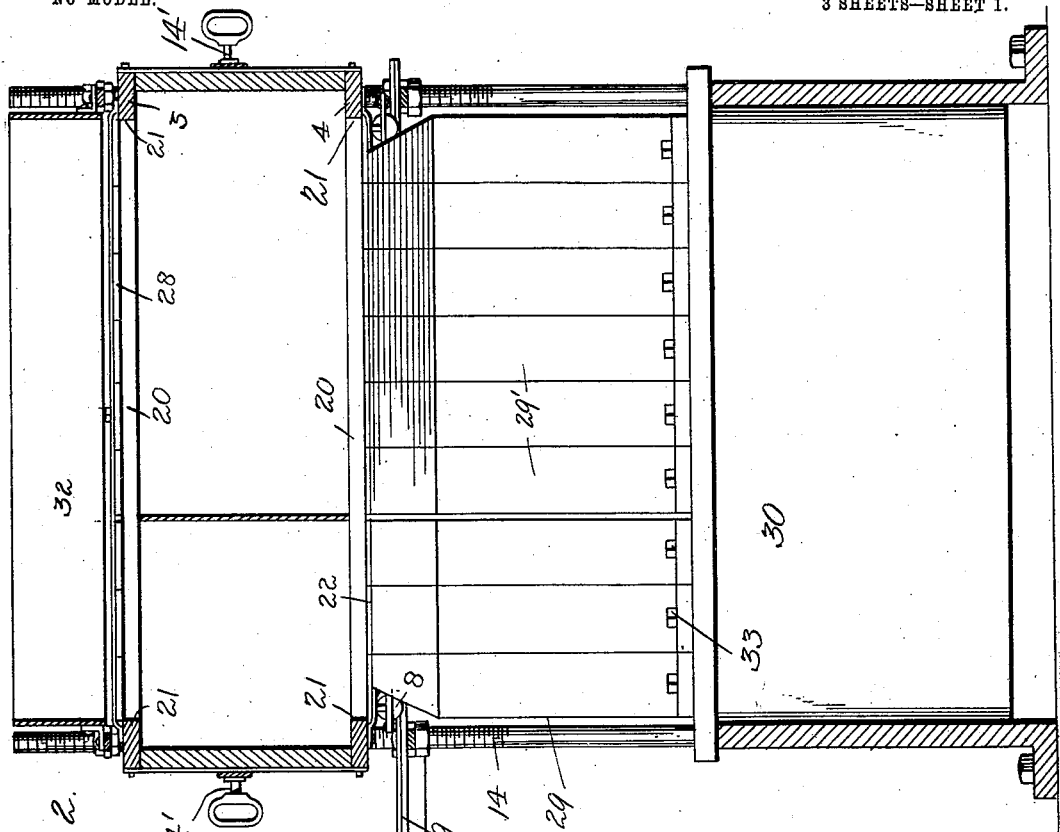
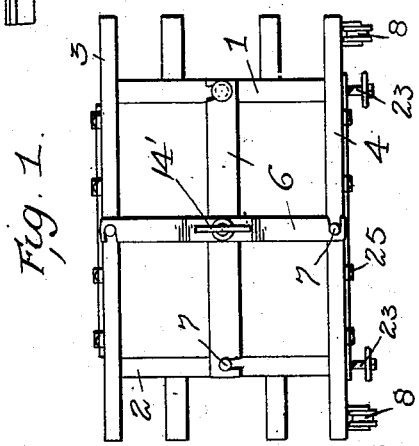
Attest:
C. Middleton
Edward Santon
Inventor:
John Brower.
by Ellis Spear & Company
Atty's

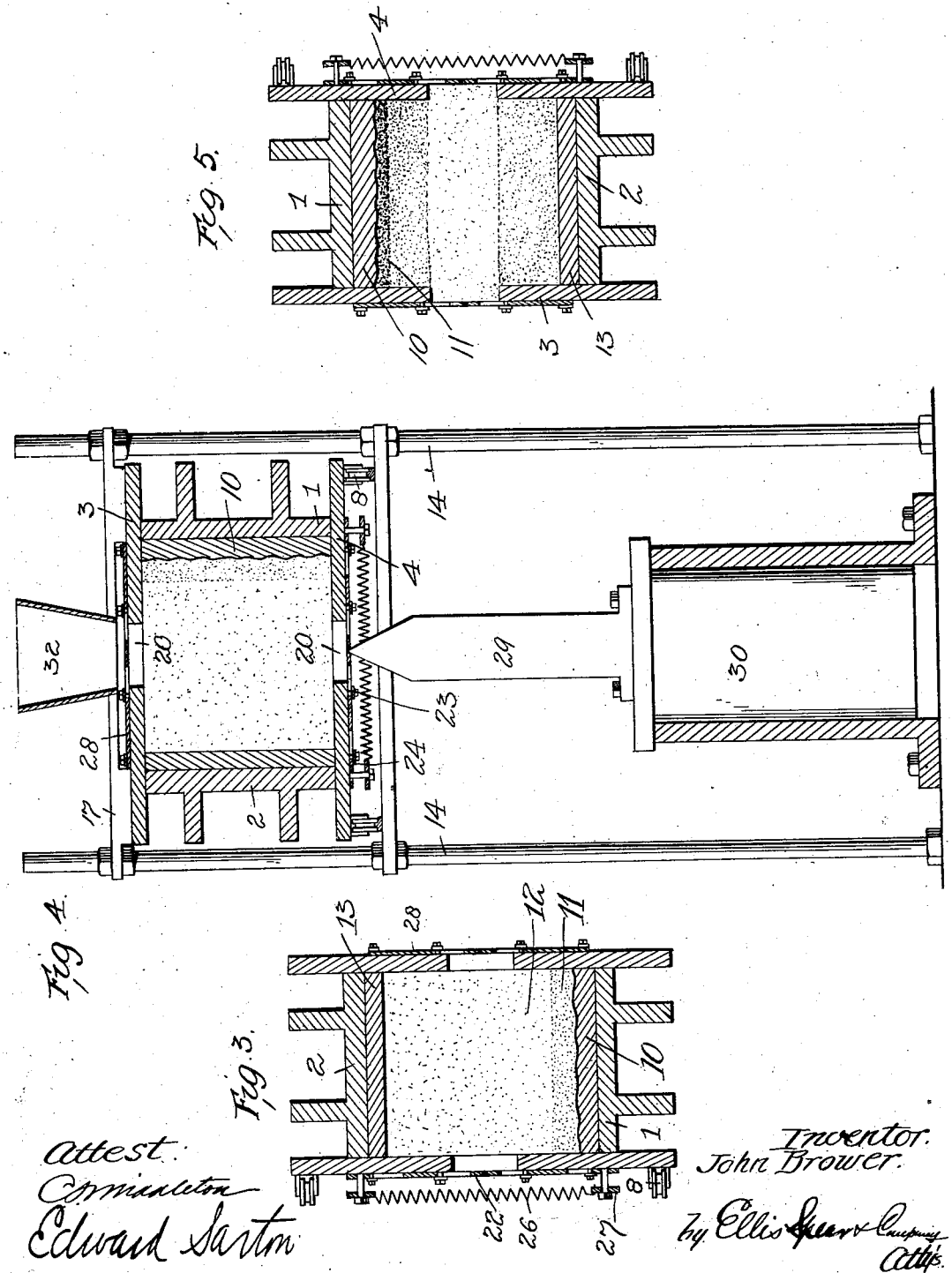

No. 754,640. PATENTED MAR. 15, 1904.
J. BROWER.
METHOD OF MAKING BLOCKS FOR BUILDING OR LIKE PURPOSES.
APPLICATION FILED AUG. 22, 1903.
NO MODEL. 3 SHEETS—SHEET 3.

Attest:
C. Middleton
Edward Saxton

Inventor.
John Brower.
by Ellis Spear & Company
Attys.

No. 754,640. Patented March 15, 1904.

UNITED STATES PATENT OFFICE.

JOHN BROWER, OF SAN FRANCISCO, CALIFORNIA.

METHOD OF MAKING BLOCKS FOR BUILDING OR LIKE PURPOSES.

SPECIFICATION forming part of Letters Patent No. 754,640, dated March 15, 1904.

Application filed August 22, 1903. Serial No. 170,498. (No model.)

*To all whom it may concern:*

Be it known that I, JOHN BROWER, a citizen of the United States, residing at San Francisco, California, have invented certain new and useful Improvements in Methods of Making Blocks for Building or Like Purposes, of which the following is a specification.

In carrying out my process I take a mass of cement or material, place the same upon a die, and shape the said mass into the form of a block. The mass of material is then perforated by forming one or more openings therein. In the opening or openings a sand or like core is placed, which is allowed to remain until the cement has hardened sufficiently to sustain its own weight or maintain its shape at the portions surrounding the perforation, after which the sand core is removed and the die separated from the block.

In carrying out my method I employ, preferably, certain mechanical agencies to facilitate the work and render the product uniform in shape and in its general character. In carrying out my invention with these mechanical appliances I take a mass of the plastic material or moist cement and place the same in a mold-box, and I then form the desired openings through this mass of plastic material, at the same time compressing the material within the mold-box so that the same will be of the proper density and strength when removed from the mold-box and dried. After forming the openings through the plastic material and compressing said material within the mold-box I introduce into the said openings a filler or fillers, preferably formed of sand. The sides of the mold-box are then stripped from the plastic material now in the form of a hollow block, with a sand filler or fillers therein, and the block is allowed to dry. In introducing the plastic material into the mold-box I place at the bottom of the box a mold or die plate having its upper face of any suitable ornamental form or design, and upon this is placed a layer of rich plastic material and upon this again is placed a body of poorer material. The above process of forming the openings, compressing the material, and placing the sand filler or core is then performed, and when the parts of the mold-box are stripped from the formed plastic material the layer of rich plastic material is uppermost, and by removing the die therefrom the ornamental face is left exposed for drying. I prefer to place the cement in the mold-box while the same is in a position with the die at the lower part thereof and with its face uppermost, and I then turn the mold-box on its side and form the opening or openings vertically through the mass by an upwardly-moving plunger or wedge, and as this recedes the sand core or filler is introduced from above the mass. Before turning the mold-box and mass of material on its side to form the openings a cover board or plate is placed on the mass and after the box with its contained mass is turned on its side and the opening or openings are formed therein and the sand filler introduced the mold-box is given another quarter-turn, so that the die is uppermost and the cover plate or board is lowermost, and after this the sides of the mold-box and the die are stripped away from the mass, leaving the formed mass of material resting on the board or plate for drying and hardening with the sand core or cores therein.

I show in the accompanying drawings one way of carrying out my invention and the preferred means therefor.

Figure 7:
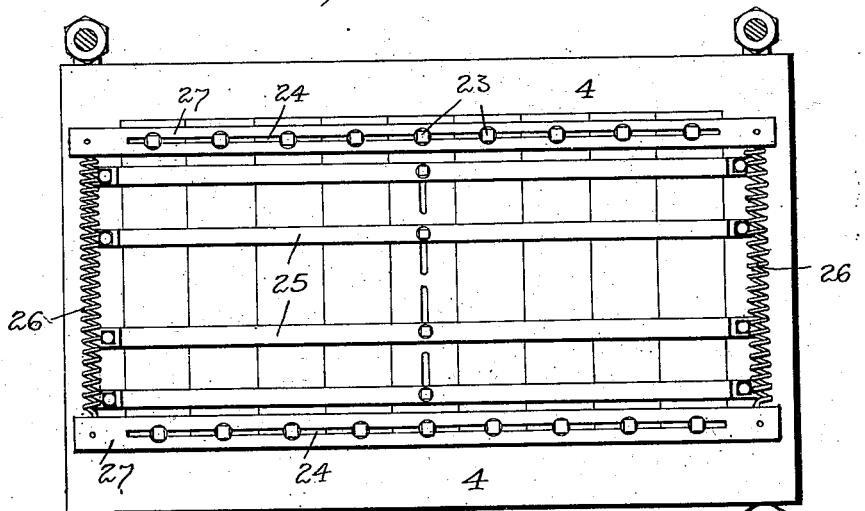

In the drawings, Figure 1 is an end view of a mold-box for carrying out my invention. Fig. 2 is a sectional view taken longitudinally through the mold-box and part of the ram, some of the parts being shown in side elevation. Fig. 3 is a view of the mold-box in its first position adapted to receive the material. Fig. 4 shows it in its second position. Fig. 5 shows it in its third and last position. Fig. 6 is a plan view of the mold-box with the plastic material therein. Fig. 7 is a bottom plan view of the mold-box.

Referring first to the mold-box, it will be seen that this box is composed of a bottom plate 1, a top plate 2, and side plates 3 and 4. These are removably connected to each other by any suitable fastening means, and I have shown one way in which these parts composing the mold-box may be secured together, consisting of latches 6, suitably pivoted to the outer sides of the end plates, engaging pins 7, projecting from the end edges of the top and bottom plates and the side plates. The mold-box is provided with rollers 8, journaled in bearings secured to the plate 4 and adapted to run upon tracks or rails 9, supported by the frame of the machine, and these tracks are extended to one side of the frame of the machine, where they may be supported by any suitable table or an extension of the frame, such as indicated at 9'. The mold-box is filled with the plastic material while it is supported at one side of the machine upon the table or extension 9' and while it is in position with its top 2 uppermost, as indicated in Fig. 3. Before the plastic material is placed in the mold I place upon the bottom 1 a die or mold plate 10, having its upper face of the ornamental configuration or of the design which it is intended to give to the face of the block when completed. Upon this die-plate a layer of rich plastic material is placed, this layer being comparatively thin, and upon this again is placed the mass of poorer material, which entirely fills the mold-box above the layer of rich material. The layer of rich material is indicated at 11 and the mass of poorer material at 12. Upon the upper surface of the mass 12 a board 13 is placed, and upon this again is placed the cover or top 2, which is then secured in proper position by means of one of the latches 6, carried by the end plate of the mold. After having been filled the mold-box is given a quarter-turn and is placed upon the rails 9, and in thus turning the mold any suitable form of crane or power lifting-machine may be employed, and to afford a suitable hold for such machine the end plates of the mold-box may have suitable lugs or extensions 14'. After having been placed on the rails the mold-box is run into position within the frame of the machine between standards or straining-rods 14. The sides 3 and 4 of the mold-box, which now temporarily form the top and bottom of the same, as shown in Fig. 4, are provided with openings 20, arranged centrally thereof and extending longitudinally but not through to the ends, the said openings ending at the points 21, as indicated in Fig. 2. These openings are normally closed by slides, those marked 22 for the side 4 being arranged to slide on the outer or lower side of the said side plate 4, where they are guided by means of bolts 23, passing through slots 24 in the bars 27, and by straps or bars 25, secured to the side plate 4, which straps also serve to hold the slides or gates in place. These slides are normally held inwardly by spring-pressure, and as a representative way of exerting the spring-pressure upon the slides I have shown a spiral spring 26 connected with bars 27, to which the slides are connected. There are two series of slides, which are located on each side of the central opening in the side plate 4. The slides of each series fit closely against each other and practically form a continuous closure for the opening in the side plate 4. The slides 28, which close the upper opening 20 of the mold-box, are similarly arranged and are equal in number to the lower slides, and normally they form an unbroken closure for the opening 20. They are adapted to open automatically, as will be hereinafter described, but are not furnished with spring means for closing them automatically. They are supported and guided in a manner substantially similar to that described in connection with the lower slides 22. When the mold-box is on its side in position within the frame, it fits closely under the cross-bars 17, which are adapted to resist upward movement of the mold-box when the same is subjected to the compressing action about to be described.

In order to compress the material within the mold-box and at the same time form openings through the material to provide the blocks of hollow form, I employ wedge means to be thrust into and through the mold-box where the openings are to be formed in the block, so that the material will be compressed laterally and outwardly against the sides of the box and whereby also openings will be left in the block when the wedge means is withdrawn. The wedge means consists of a wedge or former 29, secured to a piston 30 of a suitable power-applying means, such as a hydraulic ram. The wedge or former is made up of a number of sections 29', these being equal in number to the number of closing slides in any one series of said slides, or, in other words, there are as many wedge members extending from end to end of the machine as there are closing slides or gates extending from end to end of the machine, and the wedge members and closing slides correspond in position, the joints or lines of division between the wedge members coinciding with the lateral joints or lines of division between the slides. The points of the wedge members are directed to the center line of the mold, where opposing closing sides meet, and when the wedge moves upwardly it will enter between these slides, they having their ends beveled for the entrance of the wedge, and the wedge will pass into the mold-box and in its upward passage will compress the material laterally against the sides of the mold-box, and as it continues its upward movement it will pass upward through the opening 20, the slides 28 moving back when the wedge contacts therewith. The wedge action will force the material against the die or former 10 to receive the impression from the design on the face thereof. As the wedge lowers I introduce moist sand through a hopper 32, which directs it into the openings left by the wedge, so that the molded plastic material will have a sand filler located in its opening to sustain the material while the same is setting into shape or drying. As the wedge is leaving the mold-box the lower slides or gates 22 will close, their inner edges bearing constantly upon the sides of the wedge under pressure of the spring 26, so that the said inner edges will come together at the moment that the point of the wedge is withdrawn, and thus the operation of placing the sand filler within the plastic material will follow the withdrawal of the wedge and will take the place of said wedge to prevent the collapse of the mass of the plastic material just compressed. I form the wedge in sections and I also form the closing means 22 and 28 in sections, so that blocks of different forms may be made—that is, in respect to the openings or holes therein—for it will be noticed that by simply removing the desired number of wedge-sections different sizes of openings may be formed, and, if desired, a plurality of openings may be formed through the block with webs of the cement or plastic material left between them. The wedge-sections are secured to the ram 30 by bolts 33, allowing the sections to be removed, and the slides are removably connected with the bars 27 in any suitable manner which will permit of their removal, such as by bolts 23. The upper slides may also be removed by taking out their guiding and holding bolts, as will be seen from Fig. 3. After the material has been compressed and the sand filler or fillers have been placed in the openings left by the withdrawal of the wedges the mold-box is run out from the frame on the tracks 8 to a position over the extension or table 9'. The mold-box is now given a quarter-turn by means of the crane before mentioned, or manually, if desired, and its bottom 1 is now set uppermost, as in Fig. 5, the fastenings are loosened, the sides 3 and 4 are removed, and then the bottom plate 1 is lifted off, after which the die or mold-plate 10 is lifted from the layer of rich material. After this has been done the molded block with its sand filler is lifted from the top plate 2, together with the board 13, and it is then set away to dry. While resting upon this board during this drying or setting action the sand filler will sustain the material in proper shape and prevent any displacement or collapse of any portion thereof. After drying for the proper length of time the block is removed from the board 13 and it will then be ready for use after the removal of the sand-filler, and it will be found that all of the sides are smooth and adapted for building or like purposes. The parts of the mold-box may now be put together and the above operation repeated for the formation of another block.

I claim—

1. The herein-described process of forming building-blocks and the like of cement or like material, consisting in shaping the mass of material, forming an opening or openings therein and thereby simultaneously compressing the material introducing a sand filler or core into the opening or openings and allowing the mass to dry, substantially as described.

2. The herein-described process consisting in shaping the mass in connection with a die and forming an opening or openings in the mass and thereby simultaneously compressing the material against the die and then introducing a sand core or filler into the opening or openings and allowing the mass to dry and then removing the sand, substantially as described.

3. The herein-described process consisting in shaping the mass of material, turning the same upon its side, forming an opening or openings vertically through the mass while it is in this position, introducing a sand core or filler vertically into the opening in the mass and then giving the mass a quarter-turn and allowing the same to dry, substantially as described.

4. The herein-described process consisting in shaping the mass of material in connection with a die upon which the said mass rests, turning the mass upon its side with the die-face extending vertically, forming an opening or openings through the mass while in this position and simultaneously compressing the material against the die-face, introducing a sand core vertically into the opening or openings and then turning the mass with the die uppermost and removing the said die, substantially as described.

5. The herein-described process consisting in shaping the mass of material in connection with a die upon which the said mass rests, placing a board on top of the said material, turning the mass of material upon its side, forming an opening or openings therein while in this position and simultaneously compressing the material between the board and the die, introducing a sand filler vertically into the opening or openings, turning the mass of material so as to rest upon the board and with the die uppermost, removing the die and then allowing the material to dry, substantially as described.

6. The herein-described process consisting in packing the material in a mold having a die at the lower part thereof, forming an opening or openings in the material while the same is in the mold and thereby simultaneously compressing the material outwardly against the sides of the mold, introducing a sand core vertically into the opening or openings and stripping the mold from about the material, substantially as described.

7. The herein-described process consisting in shaping the mass within the mold composed of separable members with a die within the lower part of the mold, placing a cover-board on the mass, turning the mold upon its side and forming an opening or openings vertically through the material therein while on its side, introducing a sand core or filler vertically into the opening or openings, turning the mold so that the die is uppermost and stripping the parts of the mold-box from about the mass, substantially as described.

8. The herein-described method consisting in first placing the material in a mold then forming an opening in the mass by forcing the material from its central or intermediate body portion outwardly against the sides of the mold to thereby compress the material and then introducing a core of sand into the opening while the material is still in the mold, substantially as described.

In testimony whereof I affix my signature in presence of two witnesses.

JOHN BROWER.

Witnesses:
    HENRY E. COOPER,
    WALTER DONALDSON.